(12) United States Patent
Chen

(10) Patent No.: US 11,391,245 B2
(45) Date of Patent: *Jul. 19, 2022

(54) OXIDIZER INJECTOR FOR MOTOR

(71) Applicant: TAIWAN INNOVATIVE SPACE, INC., Miaoli County (TW)

(72) Inventor: Yen-Sen Chen, Miaoli County (TW)

(73) Assignee: TAIWAN INNOVATIVE SPACE, INC., Zhunan Township (TW)

( * ) Notice: Subject to any disclaimer, the term of this patent is extended or adjusted under 35 U.S.C. 154(b) by 183 days.

This patent is subject to a terminal disclaimer.

(21) Appl. No.: 16/351,181

(22) Filed: Mar. 12, 2019

(65) Prior Publication Data

US 2020/0291897 A1  Sep. 17, 2020

(51) Int. Cl.
*F02K 9/52* (2006.01)
*F02K 9/00* (2006.01)
*F02K 9/10* (2006.01)
*F02K 9/72* (2006.01)
*B64G 1/40* (2006.01)

(52) U.S. Cl.
CPC ............... *F02K 9/52* (2013.01); *B64G 1/404* (2013.01); *F02K 9/00* (2013.01); *F02K 9/10* (2013.01); *F02K 9/72* (2013.01); *F05D 2240/35* (2013.01)

(58) Field of Classification Search
CPC ...... F02K 9/10; F02K 9/52; F02K 9/72; F23R 3/04; F23R 3/12; B64G 1/404
See application file for complete search history.

(56) References Cited

U.S. PATENT DOCUMENTS

| 3,423,943 | A | * | 1/1969 | Stark | F02K 9/72 60/251 |
| 5,101,623 | A | * | 4/1992 | Briley | F02K 9/72 239/132 |
| 6,351,939 | B1 | * | 3/2002 | Buddenbohm | B64G 1/401 60/204 |
| 2007/0062176 | A1 | * | 3/2007 | Bendel | F02K 9/52 60/204 |
| 2016/0194256 | A1 | * | 7/2016 | Whitmore | C06B 45/00 149/2 |

* cited by examiner

*Primary Examiner* — Todd E Manahan
*Assistant Examiner* — Kyle Robert Thomas
(74) *Attorney, Agent, or Firm* — Wang Law Firm, Inc.

(57) ABSTRACT

A motor has an oxidizer injector, the oxidizer injector is mainly suitable for using in a combustion chamber, the oxidizer injector has a body having a first runner assembly and a second runner assembly arranged along an axis, the first runner assembly injects oxidizer into the combustion chamber to form a forward swirl, and the second runner assembly injects oxidizer into the combustion chamber to form a reverse swirl, the axial torsion generated by the forward swirl and the axial torsion generated by the reverse swirl counteract each other, so as to solve the problem of axial torsion imbalance in the combustion chamber.

20 Claims, 10 Drawing Sheets

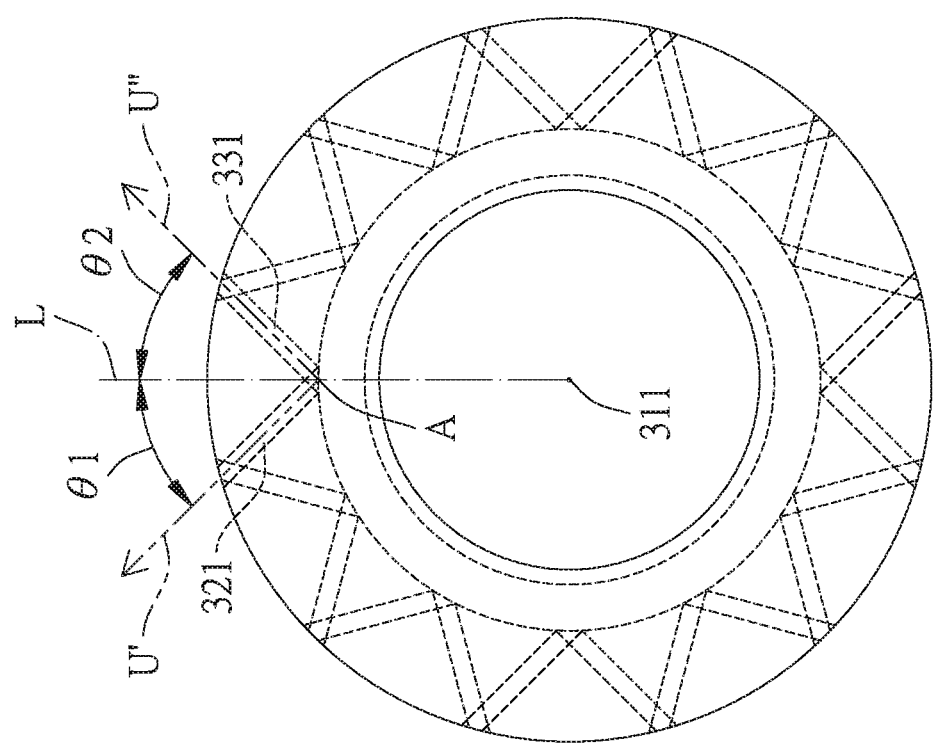

OXIDIZER INJECTOR FOR MOTOR

BACKGROUND OF THE INVENTION

Field of Invention

The present invention relates to motor, and more particularly to a motor with an oxidizer injector.

Related Art

The main structure of a rocket is shown in FIG. 1, which mainly comprises a combustion chamber 11 and an oxidizer injector 12, the oxidizer injector 12 is disposed at one end of the combustion chamber 11, and the oxidizer injector 12 injects propellant mixture into the combustion chamber 11, thereby providing the rocket with propulsion by combustion of propellant mixture in the combustion chamber 11. In particular, the types of the oxidizer injector 12 include axial injector, shower head injector, swirl injector, and needle injector; among the various types, the swirl injector has the best combustion mixing efficiency.

Referring to FIG. 1 and FIG. 2, the oxidizer injector 12 of the swirl injector is provided with a plurality of runners 121, and each of the runners 121 is respectively communicated with a feed passage 122. The oxidizer injector 12 has an inner wall surface 123 facing the feed passage 122, and an acute angle is between each of the runners 121 and the inner wall surface 123, so that each of the runners 121 is arranged obliquely clockwise around the feed passage 122 as a center.

When oxidizer is fed into the swirl injector from the feed passage 122, the oxidizer is injected from each of the runners 121, and by having each of the runners 121 obliquely disposed on the oxidizer injector 12, the injected oxidizer exhibits a swirling state in the combustion chamber 11.

However, during the flight of the rocket, the oxidizer swirling in a same direction will give the rocket an axial torsion during liftoff, resulting in additional flight control system is required for the rocket, which not only complicates the overall structure of the rocket, but also the costs are very high.

SUMMARY OF THE INVENTION

An objective of the present invention is to solve the problem that the swirl injector generates axial torsion during the injection of liquid fuel, thereby improving the propulsion performance of hybrid rocket engine.

In order to achieve the aforementioned objective, the present invention is a motor with an oxidizer injector, the oxidizer injector comprising:

a body having a feed passage as well as a first runner assembly and a second runner assembly which communicate with the feed passage, the feed passage having an axis, the first runner assembly and the second runner assembly being sequentially arranged along the axis, the first runner assembly having a plurality of forward runners, and the second runner assembly having a plurality of reverse runners, each of the forward runners being inclined clockwise about the axis and defining a forward running direction, and each of the reverse runners being inclined clockwise about the axis and defining a reverse running direction, one of the forward running directions being defined as a first forward running direction, and one of the reverse running directions being defined as a first reverse running direction, the first forward running direction and the first reverse running direction extending and a position of intersection being an intersection point, a central axis being located between the forward runners and the reverse runners and extending outward along a radial direction of the body, the forward runners being on one side of the central axis, and the reverse runners being on another side of the central axis, a forward angle being formed between the first forward running direction and the central axis, a reverse angle being formed between the first reverse running direction and the central axis, and an absolute value of the forward angle and an absolute value of the reverse angle being equal.

In order to achieve the aforementioned objective, the present invention, in a second embodiment, is a motor with an oxidizer injector, the oxidizer injector comprising:

a body having a feed passage and a first runner assembly and a second runner assembly which communicate with the feed passage, the feed passage having an axis, the first runner assembly and the second runner assembly being sequentially arranged along the axis, the first runner assembly having a plurality of forward runners, each of the forward runners being inclined clockwise about the axis and defining a forward running direction, and the second runner assembly having a plurality of reverse runners, each of the reverse runners being inclined counterclockwise about the axis and defining a reverse running direction, one of the forward running directions being defined as a first forward running direction, and one of the reverse running directions being defined as a first reverse running direction, the first forward running direction and the first reverse running direction extending and a position of intersection being an intersection point, and a central axis being located between the forward runners and the reverse runners and extending outward along a radial direction of the body, a forward angle being formed between the first forward running direction and the central axis, a reverse angle being formed between the first reverse running direction and the central axis, and an absolute value of the forward angle and an absolute value of the reverse angle being equal.

Preferably, the absolute value of the forward angle and the absolute value of the reverse angle are between 20 and 80 degrees.

Preferably, the body has an inner wall surface facing the feed passage, an injection angle is formed between each of the forward runners and the inner wall surface, as well as between each of the reverse runners and the inner wall surface, and the injection angle is between 20 and 90 degrees.

Preferably, the combustion chamber has a bulkhead surrounding and defining a combustion port, one end of the bulkhead is disposed with an oxidizer injector, and another end opposite to the oxidizer injector is disposed with a nozzle, and a direction of the oxidizer injector extending to the nozzle is an axis. A solid fuel segment is installed in the combustion port and located on the bulkhead, a plurality of protrusions are disposed on the solid fuel segment along the axis, each of the protrusions has a protrusion top surface, and a first distance is between the protrusion top surface and the bulkhead. A recess is formed between each of the two protrusions, the recess has a recess top surface, a second distance is between the recess top surface and the bulkhead, and the first distance is greater than the second distance.

Preferably, the nozzle has a nozzle throat, the nozzle throat has a diameter extending along a radial direction, a length of the first distance is 10% to 50% of the diameter.

Preferably, each of the protrusion top surfaces respectively has a first length along an extending direction extending from one end of the combustion chamber to another end of the combustion chamber, and one end of the combustion chamber extends to another end is a second length, and a total length of the first lengths is 5% to 25% of a total length of the second length.

Preferably, the absolute value of the forward angle and the absolute value of the reverse angle are between 20 and 80 degrees. The body has an inner wall surface facing the feed passage, an injection angle is formed between each of the forward runners and the inner wall surface, as well as between each of the reverse runners and the inner wall surface, and the injection angle is between 20 and 90 degrees.

In order to achieve the aforementioned objective, the present invention, in a fourth embodiment, is an oxidizer injector for motor, suitable for using in a combustion chamber, and the oxidizer injector for motor, comprising:

a body having a first runner assembly and a second runner assembly, the first runner assembly injecting oxidizer into the combustion chamber to form a forward swirl, and the second runner assembly injecting oxidizer into the combustion chamber to form a reverse swirl, the axial torsion generated by the forward swirl and the axial torsion generated by the reverse swirl counteracting each other.

After oxidizer is fed into the feed passage, the oxidizer flows from the feed passage to the forward runners and the reverse runners and injects from the forward runners and the reverse runners, the oxidizer injected by the forward runners forms a forward swirl in the combustion chamber, and the oxidizer injected by the reverse runners forms a reverse swirl in the combustion chamber, thereby the axial torsion generated by the forward swirl and the axial torsion generated by the reverse swirl counteract each other to solve the problem of axial torsion imbalance in the combustion chamber.

BRIEF DESCRIPTION OF THE DRAWINGS

FIG. 7 is a perspective view of first runners and second runners in a first embodiment;

DETAILED DESCRIPTION OF THE INVENTION

Figure 1:
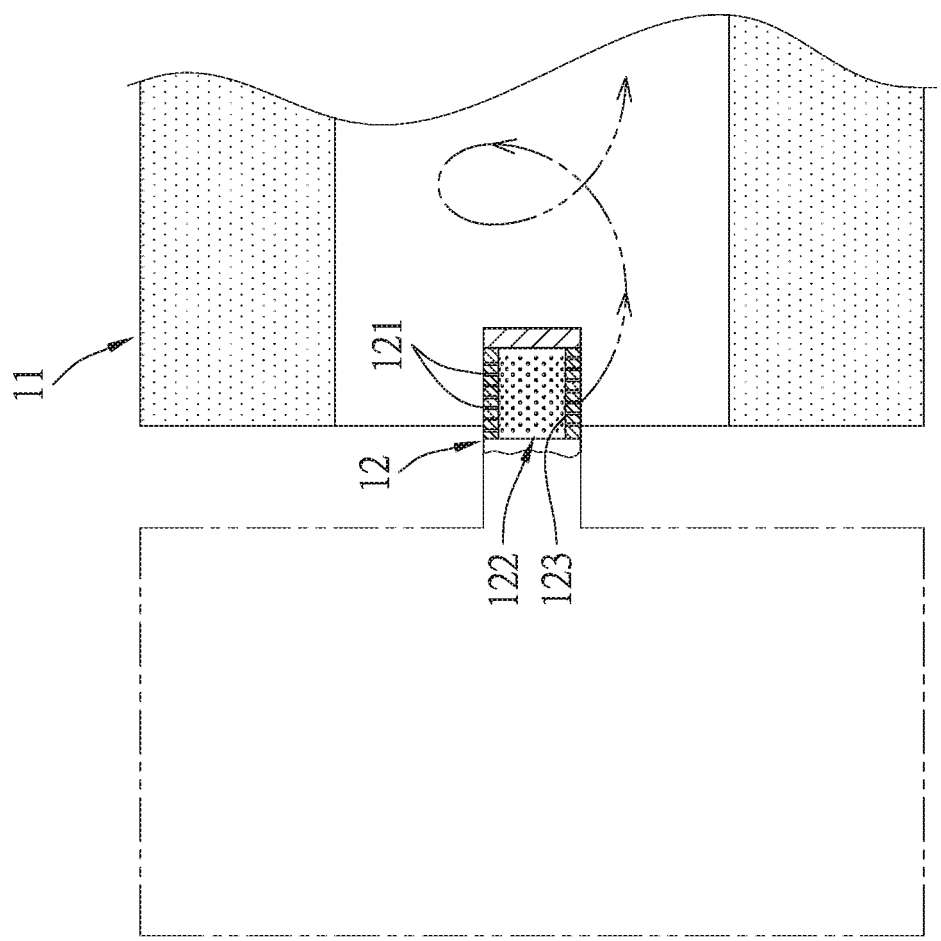
FIG. 1 is a schematic diagram of the structure of a conventional oxidizer injector and the injection swirl.
Figure 2:
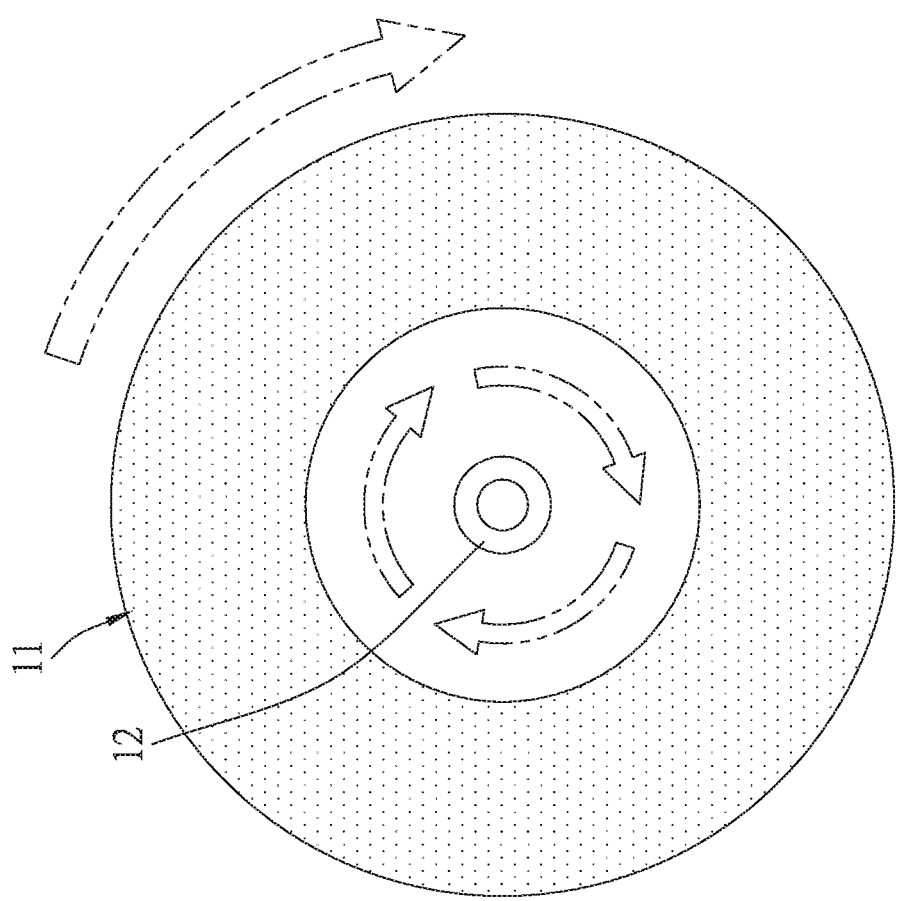
FIG. 2 is a schematic diagram of the swirl of a conventional oxidizer injector.
Figure 3:
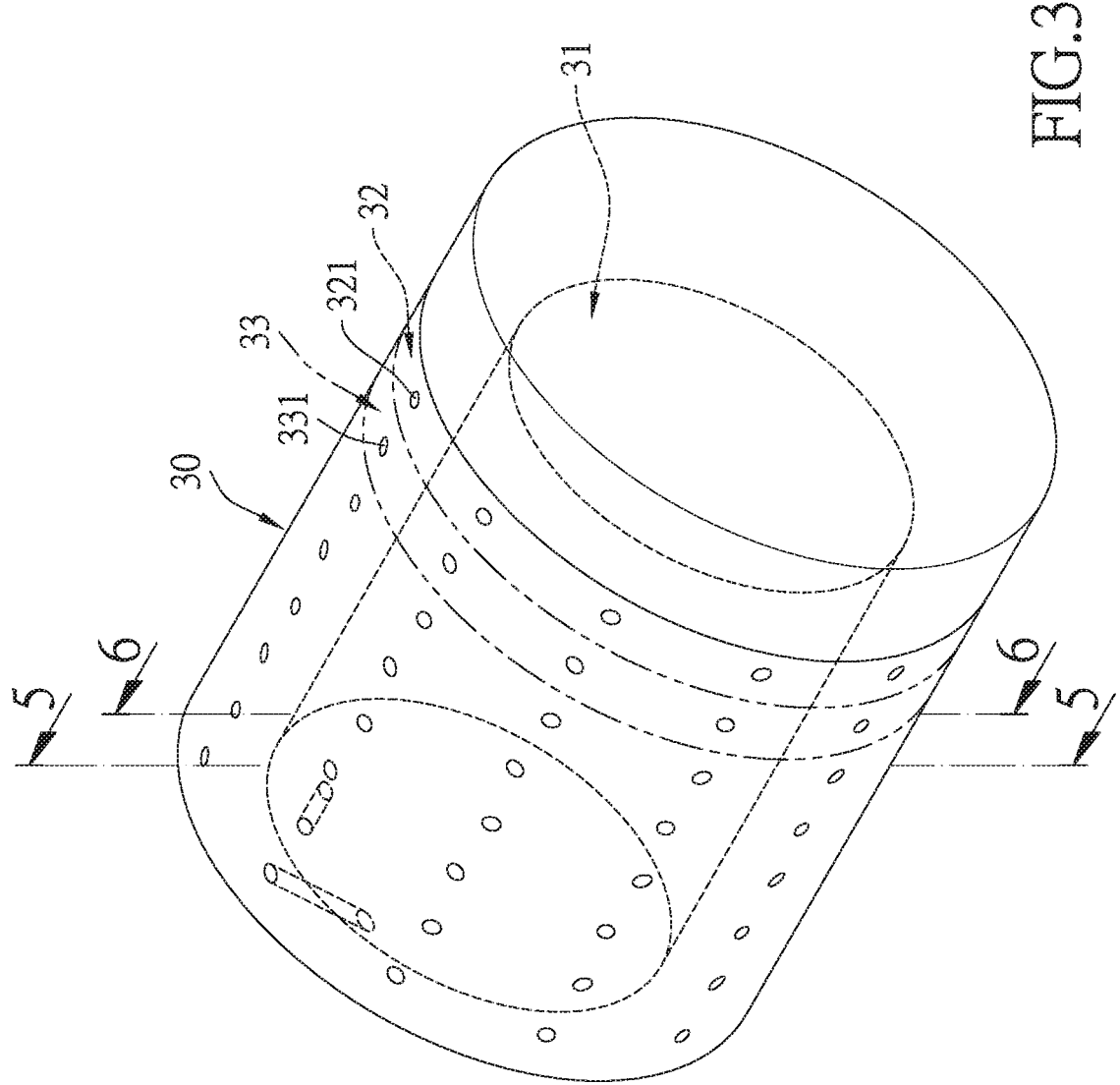
FIG. 3 is a perspective view of the present invention.

The foregoing and other technical contents, features and effects of the present invention to achieve the above objective will be clearly presented in the following detailed description of the preferred embodiments with reference to the drawings.

Referring to FIG. 3 to FIG. 7, the present invention is a motor with an oxidizer injector, the oxidizer injector is suitable for using in a combustion chamber 20 with a combustion port 21 therein, and the oxidizer injector for motor comprises the following.

A body 30 has a feed passage 31 as well as a first runner assembly 32 and a second runner assembly 33 communicating with the feed passage 31. The feed passage 31 has an axis 311, the first runner assembly 32 and the second runner assembly 33 are sequentially arranged along the axis 311. The first runner assembly 32 has a plurality of forward runners 321, and the second runner assembly 33 has a plurality of reverse runners 331, each of the forward runners 321 is disposed along a forward running direction U', and each of the reverse runners 331 is disposed along a reverse running direction U'". The first forward running direction U' and the first reverse running direction U'" extend and a position of intersection is an intersection point A, as shown in FIG. 7, a central axis L (the central axis L extends in the radial direction of the feed passage 31 and is perpendicular to the axis 311) is located between the forward runners 321 and the reverse runners 331 and extends outward along a radial direction of the body 30, the first forward runner 321 is on one side of the central axis L, and the first reverse runner 331 is on another side of the central axis L. A forward angle θ1 is formed between the first forward running direction U' and the central axis L, a reverse angle θ2 is formed between the first reverse running direction U'" and the central axis L, and an absolute value of the forward angle θ1 and an absolute value of the reverse angle θ2 are equal.

In particular, the absolute value of the forward angle θ1 and the absolute value of the reverse angle θ2 are between 20 and 80 degrees to obtain an optimum combustion efficiency.

In a first embodiment, quantities of the first runner assembly 32 and the second runner assembly 33 are plural, and each of the first runner assemblies 32 and each of the second runner assemblies 33 are arranged in a staggered manner along an extending direction of the axis 311.

Figure 6:
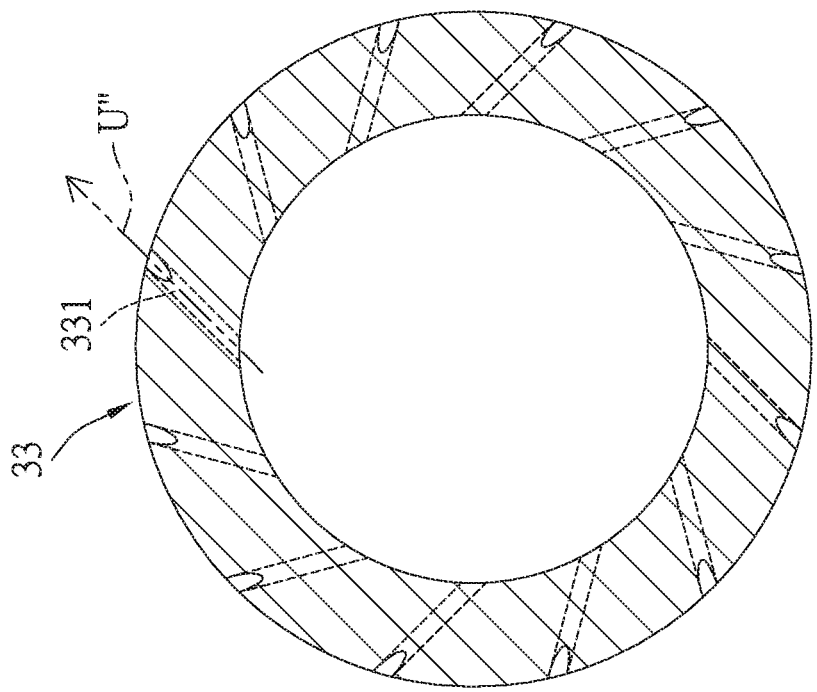
FIG. 6 is a cross-sectional view taken along line 6-6 of FIG. 3.
Figure 5:
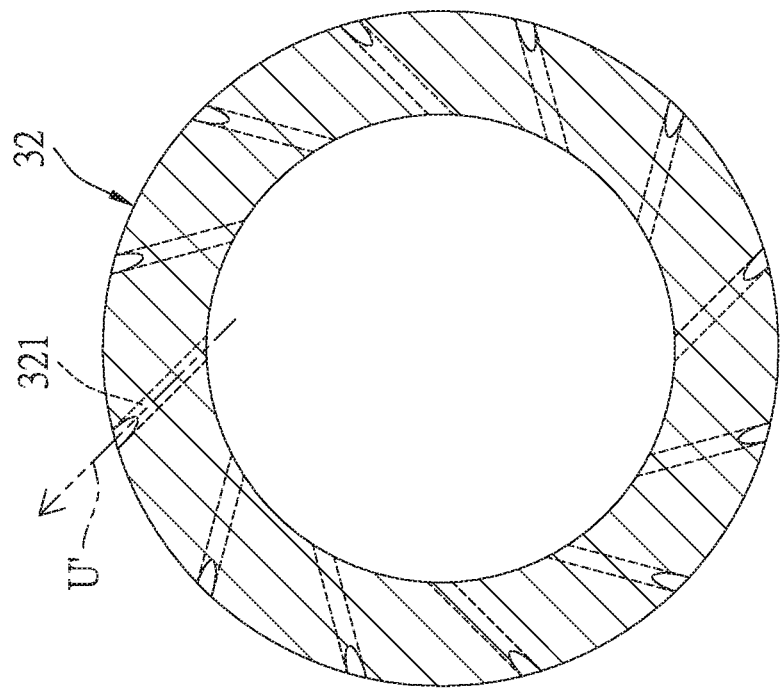
FIG. 5 is a cross-sectional view taken along line 5-5 of FIG. 3.

Referring to FIG. 5 and FIG. 6, each of the forward runners 321 is inclined counterclockwise about the axis 311, and each of the reverse runners 331 is inclined clockwise about the axis 311.

In particular, referring to FIG. 7, one end of the first forward runner 321 and one end of the first reverse runner 331 overlap at the direction of the axis 311, and an overlapping position of the first forward runner 321 and the first reverse runner 331 is the intersection point A.

Figure 8:
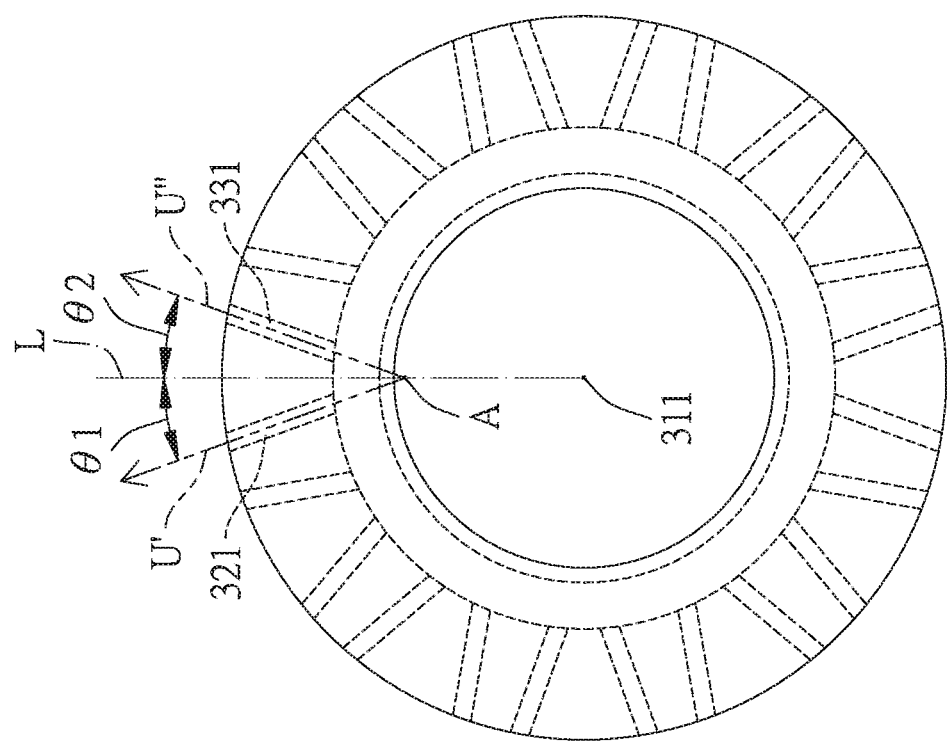
FIG. 8 is a perspective view of the first runners and the second runners in a second embodiment.

Please refer to FIG. 8 for a second embodiment, one end of the first forward runner 321 and one end of the first reverse runner 331 do not overlap at the direction of the axis 311. However, the first forward runner 321 extends along the first forward running direction U'. The first forward running direction U' and the first reverse running direction U'" extend and a position of intersection is the intersection point A.

The above is the structural configuration and the connection relationship of the first embodiment and the second embodiment of the present invention, and the mode of use of the present invention is as follows.

Figure 9:
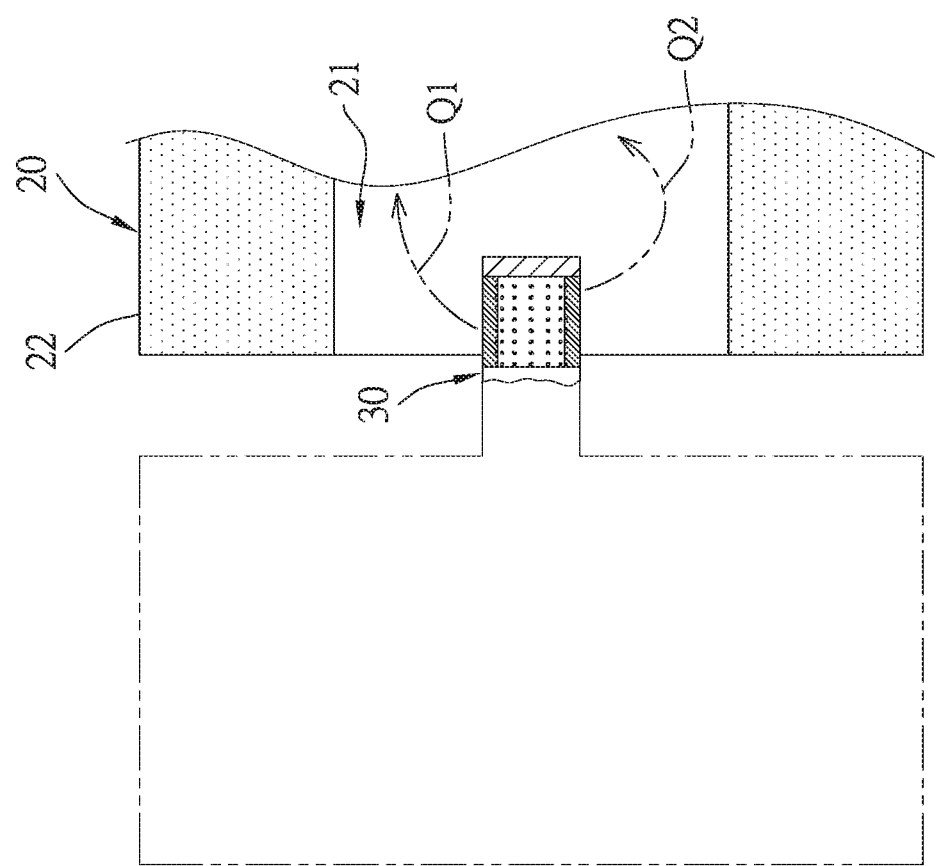
FIG. 9 is a schematic view of the swirl of injection of oxidizer into a combustion chamber in the first embodiment and the second embodiment.

Referring to FIG. 9, oxidizer is fed into the feed passage 31, the oxidizer flows from the feed passage 31 to the forward runners 321 and the reverse runners 331 and injects from the forward runners 321 and the reverse runners 331, the oxidizer injected by the forward runner 321 forms a forward swirl Q1 in the combustion chamber 20, and the oxidizer injected by the reverse runner 331 forms a reverse swirl Q2 in the combustion chamber 20, thereby the axial torsion generated by the forward swirl Q1 and the axial torsion generated by the reverse swirl Q2 counteract each other to solve the problem of axial torsion imbalance in the combustion chamber 20.

Figure 4:
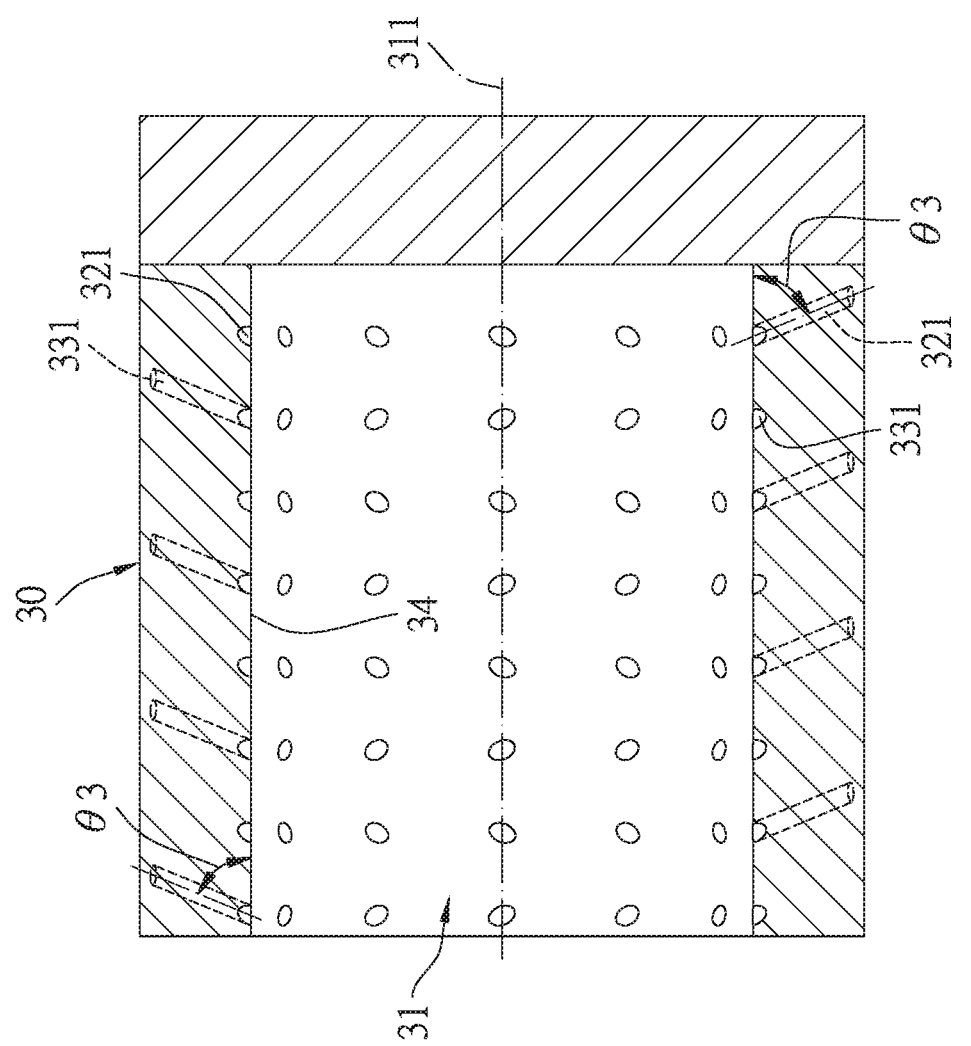
FIG. 4 is a cross-sectional view of the present invention.

In particular, referring to FIG. 4, the body 30 has an inner wall surface 34 facing the feed passage 31, an injection angle θ3 is formed between each of the forward runners 321 and the inner wall surface 34, as well as between each of the reverse runners 331 and the inner wall surface 34, the injection angle θ3 is located on a side close to the combustion chamber 20, and the injection angle θ3 is between 20 and 90 degrees to obtain an optimum combustion efficiency.

Figure 10:
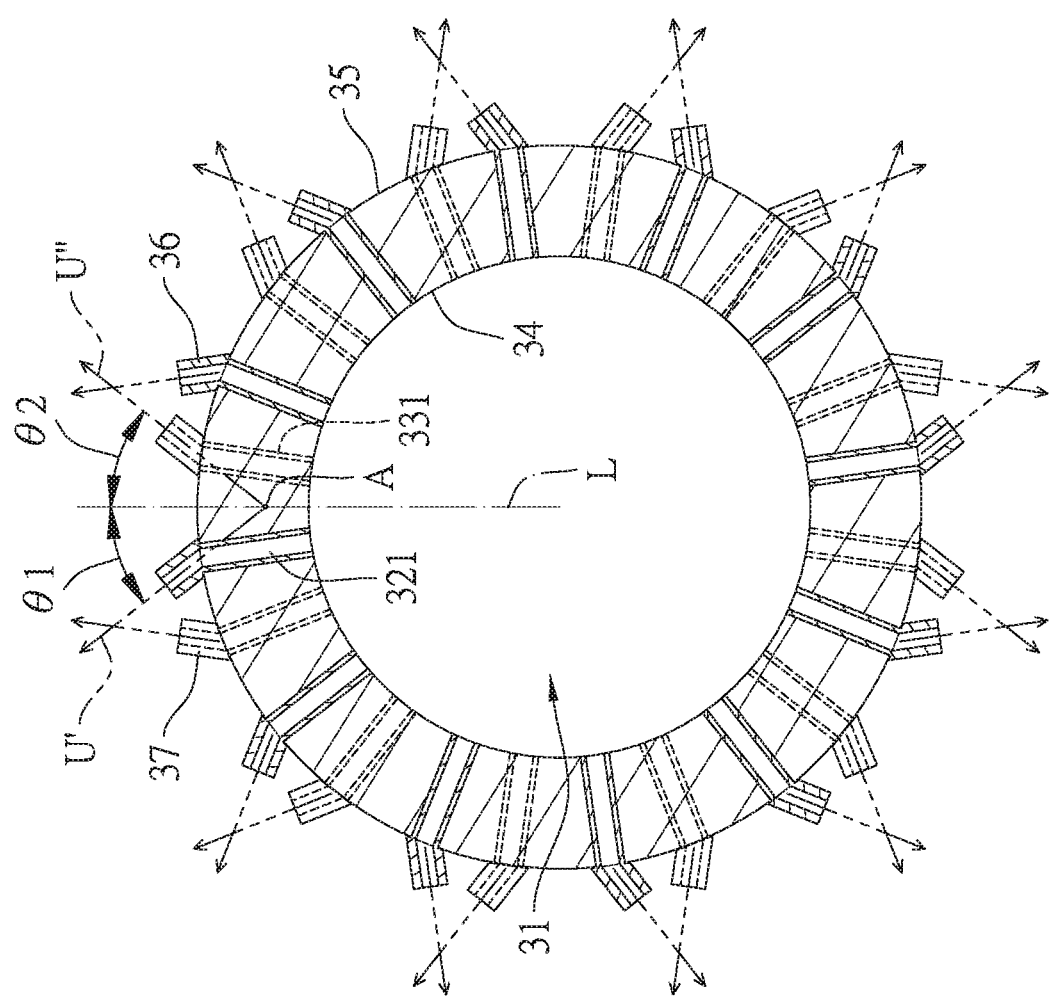
FIG. 10 is a perspective view of the first runners and the second runners in a third embodiment.

Referring to FIG. 10, in a third embodiment of the present invention, each of the forward runners 321 and the reverse runners 331 extends along the radial direction of the body 30. A plurality of first through pipes 36 and a plurality of second through pipes 37 are respectively connected to an outer wall surface 35 of the body 30. Each of the first through pipes 36 communicates with each of the forward runners 321 respectively, and is disposed along the first forward running direction U'. Each of the second through pipes 37 communicates with each of the reverse runners 331, and is disposed along the first reverse running direction U".

Figure 11:
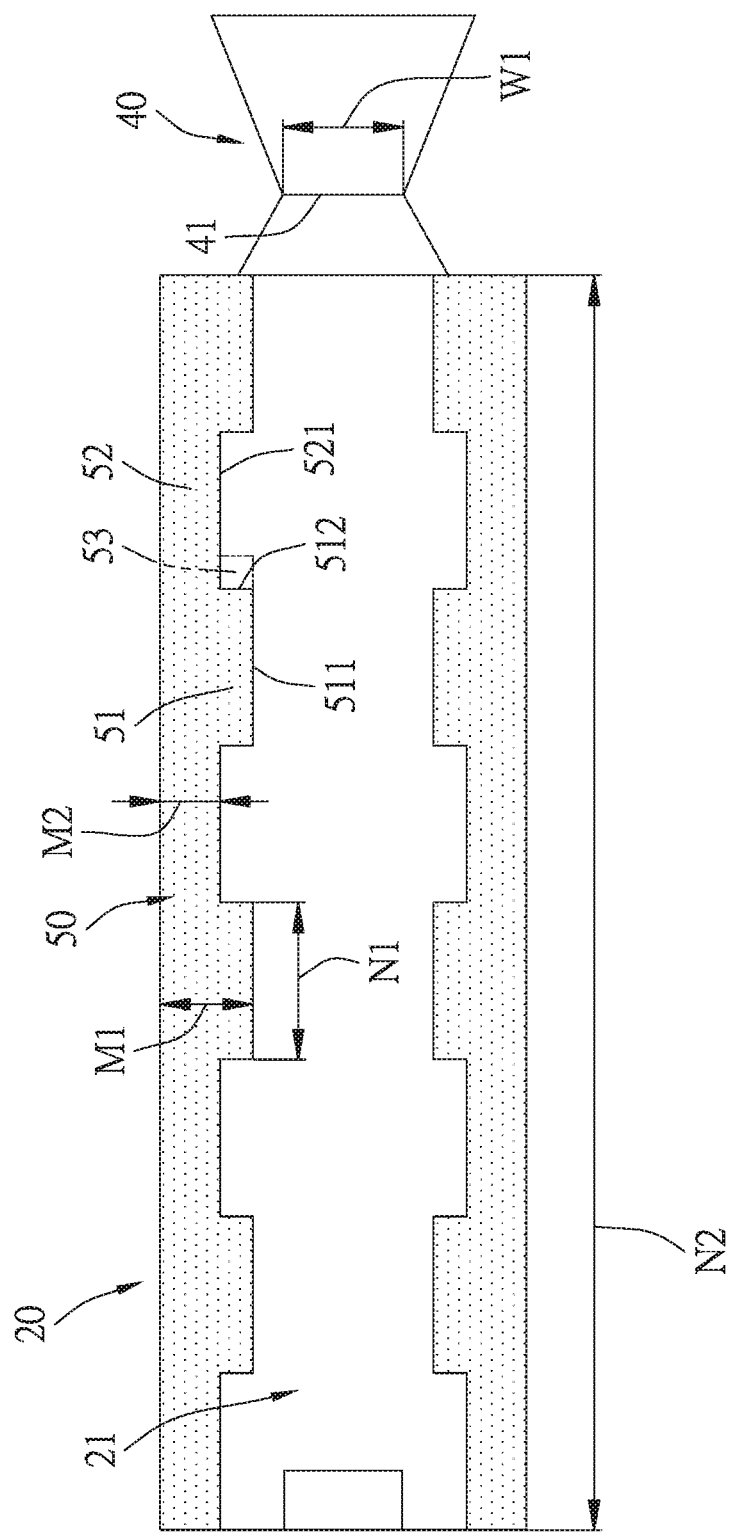
FIG. 11 is a cross-sectional view of the combustion chamber in a fourth embodiment.

Referring to FIG. 11, in a fourth embodiment, which is a motor, wherein the combustion chamber 20 has a bulkhead 22 surrounding and defining a combustion port 21, one end of the bulkhead 22 is disposed with the oxidizer injector, and another end opposite to the oxidizer injector is disposed with a nozzle 40, and a direction of the oxidizer injector extending to the nozzle 40 is the axis 311.

The solid fuel segment 50 is installed in the combustion port 21 and located on the bulkhead 22, a plurality of protrusions 51 are disposed on the solid fuel segment 50 along the axis 311, each of the protrusions 51 has a protrusion top surface 511, a first distance M1 is between the protrusion top surface 511 and the bulkhead 22, and a recess 52 is formed between the every two neighboring protrusions 51, the recess 52 has a recess top surface 521, a second distance M2 is between the recess top surface 521 and the bulkhead 22, and the first distance M1 is greater than the second distance M2. Each of the protrusions 51 respectively has a diffusion flame surface 512 facing the nozzle 40, and a flame holding hot-gas region 53 is formed between each of the diffusion flame surfaces 512 and the connected recess top surface 521, respectively. When the propellant mixture is burned in the combustion chamber 21, since the solid fuel segment 50 has the protrusions 51, when the propellant mixture passes through the flame holding hot-gas region 53, eddies are formed in the flame holding hot-gas region 53, so that the propellant mixture has a better mixing and combustion efficiency as it passes through the flame holding hot-gas region 53, thereby allowing the solid fuel segment 50 to have an even regression rate.

Preferably, the nozzle 40 has a nozzle throat 41, the nozzle throat 41 has a diameter W1 extending along a radial direction, and a length of the first distance M1 is 10% to 50% of the diameter W1.

Preferably, each of the protrusion top surfaces 511 respectively has a first length N1 along an extending direction extending from one end of the combustion chamber 20 to another end of the combustion chamber 20, and one end of the combustion chamber 20 extends to another end is a second length N2, and a total length of the first lengths N1 is 5% to 25% of a total length of the second length N2.

In summary, the above embodiments and drawings are merely the preferred embodiments of the present invention, and the scope of implementation of the present invention is not limited thereto. In other words, all the equivalent changes and modifications made according to the appended claims shall still fall within the scope covered by the appended claims of the present invention.

What is claimed is:

1. A hybrid rocket motor with an oxidizer injector, the oxidizer injector comprising:
a body having a feed passage as well as a first runner assembly and a second runner assembly which communicate with the feed passage, the feed passage having an axis, the first runner assembly and the second runner assembly being sequentially arranged along the axis, the first runner assembly having a plurality of forward runners, and the second runner assembly having a plurality of reverse runners, each of the forward runners being inclined clockwise about the axis and defining a forward running direction, and each of the reverse runners being inclined clockwise about the axis and defining a reverse running direction, one of the forward running directions being defined as a first forward running direction, and one of the reverse running directions being defined as a first reverse running direction, the first forward running direction and the first reverse running direction extending and a position of intersection being an intersection point in a combustion chamber of the hybrid rocket motor, a central axis being located between the forward runners and the reverse runners and extending outward along a radial direction of the body, the forward runners being on one side of the central axis, and the reverse runners being on another side of the central axis, a forward angle being formed between the first forward running direction and the central axis, a reverse angle being formed between the first reverse running direction and the central axis, and an absolute value of the forward angle and an absolute value of the reverse angle being equal.

2. The motor with the oxidizer injector as claimed in claim 1, wherein the absolute value of the forward angle and the absolute value of the reverse angle are between 20 and 80 degrees.

3. The motor with the oxidizer injector as claimed in claim 1, wherein the body has an inner wall surface facing the feed passage, an injection angle is formed between each of the forward runners and the inner wall surface, as well as between each of the reverse runners and the inner wall surface, and the injection angle is between 20 and 90 degrees.

4. The motor with the oxidizer injector as claimed in claim 1, wherein the combustion chamber has a bulkhead surrounding and defining a combustion port, one end of the bulkhead is disposed with an oxidizer injector, and another end opposite to the oxidizer injector is disposed with a nozzle, a direction of the oxidizer injector extending to the nozzle is an axis; a solid fuel segment is installed in the combustion port and located on the bulkhead, a plurality of protrusions are disposed on the solid fuel segment along the axis, each of the protrusions has a protrusion top surface, and a first distance is between the protrusion top surface of each of the protrusions and the bulkhead, a recess is formed between every two neighboring protrusions, the recess has a recess top surface, a second distance is between the recess top surface and the bulkhead, and the first distance is greater than the second distance.

5. The motor with the oxidizer injector as claimed in claim 4, wherein the nozzle has a nozzle throat, the nozzle throat has a diameter, a length of the first distance is 10% to 50% of the diameter.

6. The motor with the oxidizer injector as claimed in claim 4, wherein each of the protrusion top surfaces respectively has a first length along an extending direction extending from one end of the combustion chamber to another end of the combustion chamber, and one end of the combustion chamber extends to another end is a second length, and a total length of the first lengths is 5% to 25% of a total length of the second length.

7. The motor with the oxidizer injector as claimed in claim 4, wherein the absolute value of the forward angle and the absolute value of the reverse angle are between 20 and 80 degrees; the body has an inner wall surface facing the feed passage, an injection angle is formed between each of the forward runners and the inner wall surface, as well as between each of the reverse runners and the inner wall surface, and the injection angle is between 20 and 90 degrees.

8. A hybrid rocket motor with an oxidizer injector, comprising:
body having a feed passage and a first runner assembly and a second runner assembly which communicate with the feed passage, the feed passage having an axis, the first runner assembly and the second runner assembly being sequentially arranged along the axis, the first runner assembly having a plurality of forward runners, each of the forward runners being inclined clockwise about the axis and defining a forward running direction, and the second runner assembly having a plurality of reverse runners, each of the reverse runners being inclined counterclockwise about the axis and defining a reverse running direction, one of the forward running directions being defined as a first forward running direction, and one of the reverse running directions being defined as a first reverse running direction, the first forward running direction and the first reverse running direction extending and a position of intersection being an intersection point in a combustion chamber of the hybrid rocket motor, and a central axis being located between the forward runners and the reverse runners and extending outward along a radial direction of the body, a forward angle being formed between the first forward running direction and the central axis, a reverse angle being formed between the first reverse running direction and the central axis, and an absolute value of the forward angle and an absolute value of the reverse angle being equal.

9. The motor with the oxidizer injector as claimed in claim 8, wherein the absolute value of the forward angle and the absolute value of the reverse angle are between 20 and 80 degrees.

10. The motor with the oxidizer injector as claimed in claim 8, wherein the body has an inner wall surface facing the feed passage, an injection angle is formed between each of the forward runners and the inner wall surface, as well as between each of the reverse runners and the inner wall surface, and the injection angle is between 20 and 90 degrees.

11. The motor with the oxidizer injector as claimed in claim 8, wherein the combustion chamber has a bulkhead surrounding and defining a combustion port, one end of the bulkhead is disposed with an oxidizer injector, and another end opposite to the oxidizer injector is disposed with a nozzle, a direction of the oxidizer injector extending to the nozzle is an axis; a solid fuel segment is installed in the combustion port and located on the bulkhead, a plurality of protrusions are disposed on the solid fuel segment along the axis, each of the protrusions has a protrusion top surface, and a first distance is between the protrusion top surface of each of the protrusions and the bulkhead, a recess is formed between every two neighboring protrusions, the recess has a recess top surface, a second distance is between the recess top surface and the bulkhead, and the first distance is greater than the second distance.

12. The motor with the oxidizer injector as claimed in claim 11, wherein the nozzle has a nozzle throat, the nozzle throat has a diameter, a length of the first distance is 10% to 50% of the diameter.

13. The motor with the oxidizer injector as claimed in claim 11, wherein each of the protrusion top surfaces respectively has a first length along an extending direction extending from one end of the combustion chamber to another end of the combustion chamber, and one end of the combustion chamber extends to another end is a second length, and a total length of the first lengths is 5% to 25% of a total length of the second length.

14. The motor with the oxidizer injector as claimed in claim 11, wherein the absolute value of the forward angle and the absolute value of the reverse angle are between 20 and 80 degrees; the body has an inner wall surface facing the feed passage, an injection angle is formed between each of the forward runners and the inner wall surface, as well as between each of the reverse runners and the inner wall surface, and the injection angle is between 20 and 90 degrees.

15. A hybrid rocket motor with an oxidizer injector, the oxidizer injector comprising:
a body having a feed passage, a plurality of communication holes penetrating the feed passage, the feed passage having an axis, a first runner assembly and a second runner assembly, wherein each of the forward runners and the reverse runners extends along a radial direction of the body, a plurality of first through pipes and a plurality of second through pipes are respectively connected to an outer wall surface of the body, each of the first through pipes communicates with each of the forward runners respectively, and is inclined clockwise about the axis and defining a forward running direction, each of the second through pipes communicates with each of the reverse runners, and is inclined counterclockwise about the axis and defining a reverse running direction, one of the forward running directions being defined as a first forward running direction, and one of the reverse running directions being defined as a first reverse running direction, the first forward running direction and the first reverse running direction extending and a position of intersection being an intersection point in a combustion chamber of the hybrid rocket motor, and a central axis being located between the forward runners and the reverse runners and extending outward along the radial direction of the body, a forward angle being formed between the first forward running direction and the central axis, a reverse angle being formed between the first reverse running direction and the central axis, and an absolute value of the forward angle and an absolute value of the reverse angle being equal.

16. The motor with the oxidizer injector as claimed in claim 15, wherein the absolute value of the forward angle and the absolute value of the reverse angle are between 20 and 80 degrees.

17. The oxidizer injector for motor as claimed in claim 15, wherein the body has an inner wall surface facing the feed passage, an injection angle is formed between each of the forward runners and the inner wall surface, as well as between each of the reverse runners and the inner wall surface, the injection angle is located on a side close to the combustion chamber, and the injection angle is between 20 and 90 degrees.

18. The motor with the oxidizer injector as claimed in claim 15, wherein the combustion chamber has a bulkhead surrounding and defining a combustion port, one end of the bulkhead is disposed with an oxidizer injector, and another end opposite to the oxidizer injector is disposed with a nozzle, a direction of the oxidizer injector extending to the nozzle is an axis; a solid fuel segment is installed in the combustion port and located on the bulkhead a plurality of protrusions are disposed on the solid fuel segment along the axis, each of the protrusions has a protrusion top surface, and a first distance is between the protrusion top surface and the bulkhead, a recess is formed between every two neighboring protrusions, the recess has a recess top surface, a second distance is between the recess top surface and the bulkhead, and the first distance is greater than the second distance.

19. The motor with the oxidizer injector as claimed in claim 18, wherein the nozzle has a nozzle throat, the nozzle throat has a diameter, a length of the first distance is 10% to 50% of the the diameter.

20. The motor with the oxidizer injector as claimed in one of claim 18, wherein each of the protrusion top surfaces respectively has a first length along an extending direction extending from one end of the combustion chamber to another end of the combustion chamber, and one end of the combustion chamber extends to another end is a second length, and a total length of the first lengths is 5% to 25% of a total length of the second length.

\* \* \* \* \*